April 25, 1950   J. F. O'DONNELL   2,505,138
PACKLESS SELF-SEALING PLUG COCK VALVE Filed March 26, 1945   2 Sheets-Sheet 1

*Inventor*
James F. O'Donnell.

By Clarence A. O'Brien
and Harvey B. Jacobson
*Attorneys*

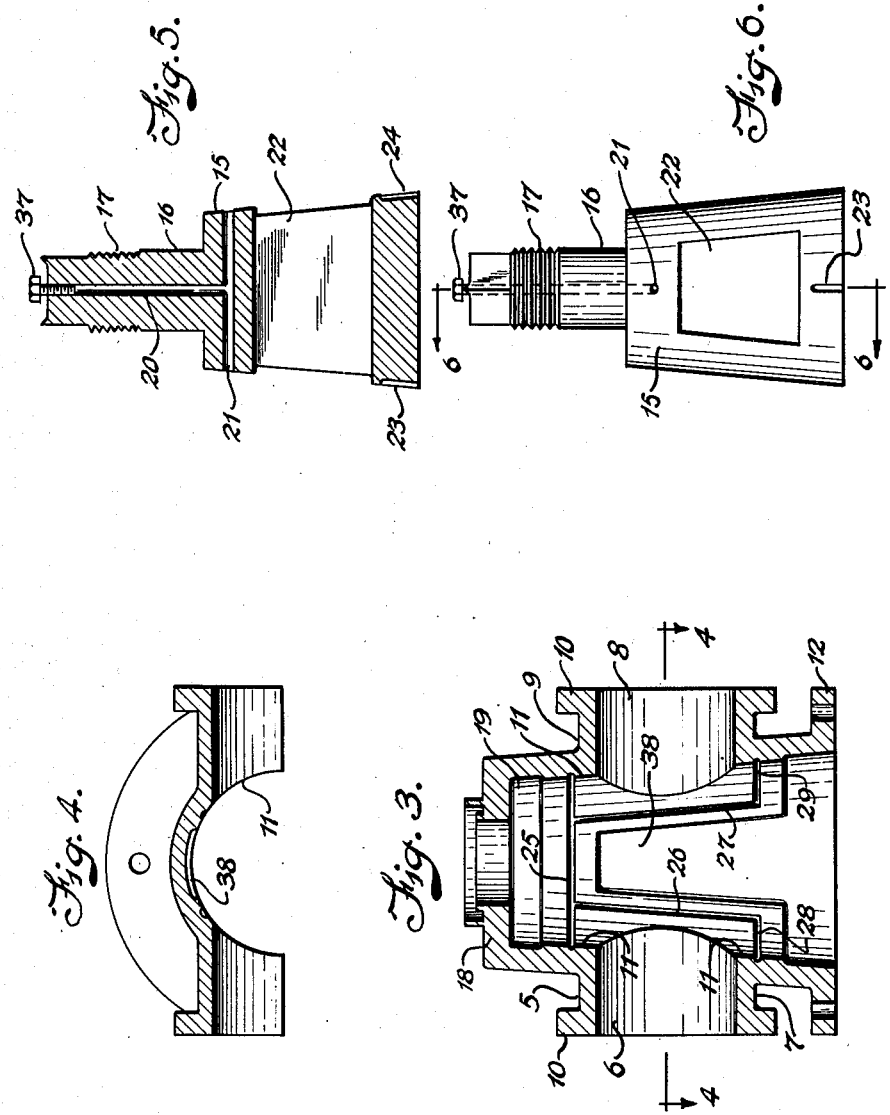

Patented Apr. 25, 1950

2,505,138

UNITED STATES PATENT OFFICE 2,505,138

PACKLESS SELF-SEALING PLUG COCK VALVE

James F. O'Donnell, Disputanta, Va.

Application March 26, 1945, Serial No. 584,787

1 Claim. (Cl. 251—93)

This invention relates to an improved plug cock valve, and one of its objects is to provide a valve of this type with means for sealing the meeting faces of the tapered plug cock and the valve body with grease, which is supplied first through a central feed passage in the tapered plug, and conducted by grooves formed in the tapered face of the valve housing or body, and so arranged that the grease is caused to accumulate above and below the tapered valve cock, and is effectively prevented from entering the pressure or flow line, which the valve controls.

Another object of the invention is to provide a valve construction, which can be economically produced and easily assembled, and which will include a spring pressed plate arranged to maintain the tapered valve cock pressure seated.

With the above and other objects in view the invention relates to certain new and useful constructions, combinations and arrangements of parts, clearly described in the following specification, and fully illustrated in the accompanying drawings, in which:

Fig. 3 is a vertical sectional view through the valve housing or body, the tapered valve cock and the spring seating means being removed.

Fig. 4 is a detail horizontal sectional view, taken on line 4—4 of Fig. 3, looking in the direction of the arrows.

Fig. 5 is a longitudinal sectional view, through the tapered valve cock, showing the grease passage ad grooves thereof.

Fig. 6 is a side elevation thereof.

Figure 1:
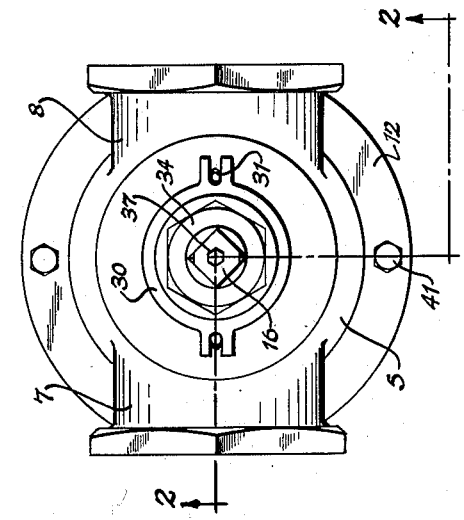
Fig. 1 is a plan view.
Figure 2:
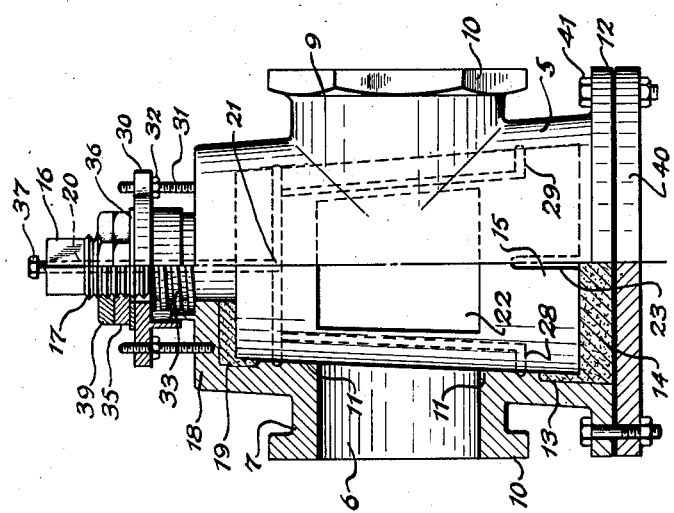
Fig. 2 is a vertical sectional view, taken on an irregular line 2—2 of Fig. 1, looking in the direction of the arrows, and showing one half of the valve in elevation.

Referring to the accompanying drawings, which illustrate the practical construction of my improved valve cock, 5 designates the valve housing or casing, also called the body, which is formed with a passage 6 in the integral nipple 7, and another and aligned passage 8 in the nipple 9. Each nipple is formed with the usual integral coupling flange 10.

The valve housing or casing 5 is also formed with a conical or tapered seat 11, the axis of which is disposed at right angles to the axis of the passages 6 and 8. The lower end of the valve casing is provided with an external coupling flange 12, and the wall of the casing in which the tapered seat 11 is formed, is enlarged at 13 to provide for a circular grease passage which communicates with the space 14 below the tapered valve cock 15, which is disposed in the casing with its outer surface in contacting engagement with the tapered seat 11.

The tapered valve cock 15 is constructed with an integral stem 16, which is formed with intermediate screw threads 17, in a reduced section of the stem. This stem is cylindrical and has a bearing in the upper end wall 18 of the valve casing. The upper end of the tapered valve cock is normally spaced below the upper end wall 18 of the valve casing, to provide a grease pocket 19, and the wall of the casing is enlarged so that this grease pocket will partly enclose the upper end of the tapered valve cock.

The tapered valve cock is formed with a grease loading passage 20, which extends axially through the stem of the cock and communicates with the transverse passage 21, formed in the tapered valve cock above the flow passage 22 thereof. The valve cock is also formed with relatively short grease passages 23 and 24 on opposite sides thereof, which do not communicate through the body of the cock with the passage 21 or the loading passage 20. The short grease passages 23 and 24 are in the form of narrow grooves, and extend upwardly from the larger lower end of the cock a short distance and do not communicate with the transverse flow passage 22 of the valve cock.

The casing seat 11 is formed with a circular grease passage or groove 25, which is disposed in the same plane as the transverse passage 21 of the valve cock. From this grease passage or groove 25 passages 26 and 27 are formed, on each side of the seat, which are spaced apart from each other a distance somewhat in excess of the width of the flow passage 22 through the valve cock, and which are disposed in approximately parallel relation to the sides of this opening or flow passage. The lower ends of the grease passages or grooves 26 and 27 are connected by the grease passages or grooves 28 and 29, which are located in the same plane as the upper ends of the short grease passages or grooves 23 and 24. The lateral grease passages or grooves 28 and 29 establish communication between the longitudinal passages or grooves 26 on one side of the seat 11, and the longitudinal passages or grooves 27 on the other side of the seat 11, but the passages or grooves 28 and 29 do not directly communicate with each other at the lower end of the valve seat, but, of course have communication with the upper grease passage or groove 25, which extends entirely around the upper portion or the valve seat.

A plate 30 is placed over the valve stem 16, and is equipped with a plurality of spacing bolts 31, the inner ends of which are engaged with the end wall 18 of the valve casing, and each bolt is equipped with a nut 32. A coil spring 33 is placed between the plate 30 and the upper side of the end wall 18, and nuts 34 and 35 are threaded on the valve stem 16 against the washer 36, above the plate 30. The spring exerts upward pressure on the valve stem to hold the valve cock seated under pressure in the valve casing.

The upper end of the axial grease passage 20 is closed by a screw plug 37, which has considerable length, so that it will serve as a screw plunger to advance grease through the passage 20, and thence through the entire series of communicating passages.

The valve seat 11 is also relieved between the longitudinal grease passages or grooves 26 and 27, so as to allow for the accumulation of grease on each side of the valve cock, but under conditions which prevent the grease from entering the flow line, each of these clearances providing grease pockets 38, as indicated in Figs. 3 and 4, which are also never in communication with the passages 26 and 27, or the upper circular passage 25, or the lower partly circular passages 28 and 29.

When the valve cock is turned the grease is taken up by the surface of the valve cock and thinly distributed over the area of the valve between the short bottom vertical grease grooves or passages 23 and 24, and the lateral passages.

The grease flows under pressure from the intake passage 20 to the lateral passage 21, emerging on opposite sides of the tapered valve cock, and enters the upper circular groove 25 of the valve seat 11. The grease then flows downwardly through the grooves 26 and 27 to the grooves 28 and 29. When the short grooves 23 and 24 of the valve cock are moved into registration with the horizontal grooves 28 and 29 of the valve seat 11, grease will flow through the valve grooves 23 and 24 into the chamber 14, below the valve cock. When the grease enters this chamber it can also fill the shallow pockets 38 formed between the grooves 26 and 27, but never in direct communication with them. Grease enters the chamber 19 above the valve cock by flow between the upper end of the valve cock and the valve seat.

The grease is retained in the chamber 14 below the valve cock by means of the protecting plate 40, which is coupled by the bolts 41 to the base flange 12 of the valve casing or body 5. By removing this plate and disconnecting the nuts and bolts of the upper end of the valve stem, the valve may be removed through the lower end of the valve casing.

It is understood that various changes in the details of construction, their combination and arrangement may be resorted to, within the scope of the invention.

Having described my invention I claim as new:

A valve comprising a substantially tubular valve body of substantially frustro-conical form, a wall closing the smaller end of said body having an opening therein which aligns with the longitudinal axis of the body, said body having a pair of aligned diametrically opposed flow passages opening into the interior thereof, the body being provided on its inner side adjacent opposite ends with annular recesses and with diametrically opposed recesses extending longitudinally inwardly from the annular recess at its larger end, said longitudinal recesses lying between the flow passages, said body also having an annular groove between the flow passages and the recess adjacent the smaller end thereof and arcuate grooves between the flow passages and the larger end thereof and said body also having longitudinal grooves establishing communication between opposite ends of the arcuate grooves and the annular groove, a frusto conical turning plug mounted to rotate in said body, said turning plug having a transversely extending flow passage which is adapted to align with the flow passages in the body when the plug is in one position, a stem on and extending axially from the smaller end of said turning plug, said turning plug having a bore extending transversely therethrough adjacent the stem, said bore lying parallel with the flow passage and communicating at opposite ends with the annular groove in the valve body, said stem having an axial bore extending thereinto which communicates with the transverse bore in the turning plug and the plug having diametrically opposed grooves lying along a plane with the axis of the transverse bore and extending from the plane of the arcuate grooves in the valve body through the adjacent end of the turning plug.

JAMES F. O'DONNELL.

REFERENCES CITED

The following references are of record in the file of this patent:

UNITED STATES PATENTS

| Number | Name | Date |
|---|---|---|
| 1,534,866 | Page | Apr. 21, 1925 |
| 1,944,995 | Nordstrom | Jan. 30, 1934 |
| 2,041,669 | Whittle | May 19, 1936 |
| 2,058,747 | Wilkins | Oct. 27, 1936 |

FOREIGN PATENTS

| Number | Country | Date |
|---|---|---|
| 176,285 | Great Britain | Mar. 9, 1922 |
| 184,357 | Great Britain | Aug. 17, 1922 |